(12) United States Patent
Derhardt et al.

(10) Patent No.: US 11,525,449 B2
(45) Date of Patent: Dec. 13, 2022

(54) COMPRESSOR WITH THERMAL EXPANSION REDUCING STRUCTURE

(71) Applicant: Robert Bosch GmbH, Stuttgart (DE)

(72) Inventors: Steffen Derhardt, Leonberg (DE); Thomas Rachow, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 16/627,455

(22) PCT Filed: Jun. 13, 2018

(86) PCT No.: PCT/EP2018/065624
§ 371 (c)(1),
(2) Date: Dec. 30, 2019

(87) PCT Pub. No.: WO2019/001961
PCT Pub. Date: Jan. 3, 2019

(65) Prior Publication Data
US 2021/0148371 A1 May 20, 2021

(30) Foreign Application Priority Data
Jun. 28, 2017 (DE) .................... 10 2017 210 977.7

(51) Int. Cl.
*F04D 29/057* (2006.01)
*F04D 29/053* (2006.01)
(Continued)

(52) U.S. Cl.
CPC ....... *F04D 25/0606* (2013.01); *F04D 29/057* (2013.01); *F04D 25/062* (2013.01);
(Continued)

(58) Field of Classification Search
CPC .......................... F05D 2240/53; F04D 29/002
(Continued)

(56) References Cited

U.S. PATENT DOCUMENTS 4,101,242 A 7/1978 Colin et al.
4,764,085 A * 8/1988 Jesinger .................. H01S 3/036
384/114

(Continued)

FOREIGN PATENT DOCUMENTS

CN 102322448 A 1/2012
DE 3503695 8/1985
(Continued)

OTHER PUBLICATIONS

International Search Report for Application No. PCT/EP2018/065624 dated Sep. 5, 2018 (English Translation, 2 pages).

*Primary Examiner* — Nathan C Zollinger
*Assistant Examiner* — Timothy P Solak
(74) *Attorney, Agent, or Firm* — Michael Best & Friedrich LLP

(57) ABSTRACT

The invention relates to a compressor machine (10; 10a), in particular a generator or a compressor unit for compressing a gas, comprising a shaft (12) which is arranged in a housing (18) so as to be able to rotate about a longitudinal axis (11) and which is mounted in at least two radial bearings (20, 22) and a thrust bearing (24), the radial bearings (20, 22) and/or the thrust bearing (24) being in the form of an aerodynamic or aerostatic bearing, the shaft (12) being at least indirectly connected to a compressor stage (15) or driving stage comprising an impeller wheel (13).

17 Claims, 1 Drawing Sheet

(51) Int. Cl.
*F04D 25/06* (2006.01)
*F04D 29/58* (2006.01)
*H02K 9/00* (2006.01)

(52) U.S. Cl.
CPC ............ *F04D 29/053* (2013.01); *F04D 29/58* (2013.01); *F04D 29/5806* (2013.01); *F05D 2240/53* (2013.01); *F05D 2260/205* (2013.01); *F05D 2260/22141* (2013.01); *H02K 9/00* (2013.01)

(58) Field of Classification Search
USPC ..................................................... 310/52–64
See application file for complete search history.

(56) References Cited

U.S. PATENT DOCUMENTS

| | | | | |
|---|---|---|---|---|
| 6,231,302 | B1* | 5/2001 | Bonardi | F01D 25/22 415/105 |
| 6,246,138 | B1 | 6/2001 | Nims | |
| 2004/0179947 | A1* | 9/2004 | Agrawal | F04D 25/0606 417/254 |
| 2007/0018516 | A1* | 1/2007 | Pal | F02C 7/12 310/58 |
| 2011/0181138 | A1* | 7/2011 | Matsumoto | H02K 9/08 310/59 |
| 2015/0171689 | A1* | 6/2015 | Wada | H02K 15/105 310/43 |
| 2016/0298648 | A1 | 10/2016 | Graham et al. | |

FOREIGN PATENT DOCUMENTS

| | | |
|---|---|---|
| DE | 102015016607 | 8/2016 |
| EP | 2884465 A1 | 6/2015 |
| EP | 3043076 | 7/2016 |
| JP | H08232753 A | 9/1996 |
| JP | H09277901 A | 10/1997 |
| JP | H11103549 A | 4/1999 |
| JP | 2001211608 A | 8/2001 |
| JP | 2002031092 A | 1/2002 |
| JP | 2012251605 | 12/2012 |

* cited by examiner

COMPRESSOR WITH THERMAL EXPANSION REDUCING STRUCTURE

BACKGROUND OF THE INVENTION

The invention relates to a compressor machine, especially a generator or a compressor unit for compressing a gas, having a shaft which is arranged in a housing so as to be able to rotate about a longitudinal axis, wherein the shaft is mounted in at least two radial bearings and one thrust bearing, wherein the radial bearings and/or the thrust bearing are designed as an aerodynamic or aerostatic bearing, and wherein the shaft is connected at least indirectly to a compressor stage or driving stage comprising an impeller wheel.

Such a compressor machine is already known from the prior art and serves for example as a compressor for compressing air or gas. In this case, a shaft of the compressor machine is mounted in a housing in at least two radial bearings and one thrust bearing. The shaft is connected to an impeller wheel, which in the case of a compressor is driven or turned by the shaft, while in the case of a generator flowing gas is brought into operative connection with the impeller wheel so that the latter drives the shaft in order to generate a current.

Furthermore, it is generally known that the efficiency of such a compressor machine is dependent on the size of the radial and axial gap dimensions. The size of the gap dimensions affects the leakage, the effective cross sections, and the losses caused by swirling, so that in this way the thermodynamic efficiency of the compressor machine is influenced. In the case of multistaged flow machines, the thermal expansion between the housing and the shaft may cause an additional enlarging of the impeller wheel gap. One possible countermeasure which is known is to reduce the thermal expansion of the housing (U.S. Pat. No. 4,101,242).

SUMMARY OF THE INVENTION

The compressor machine according to the invention has the advantage that it makes possible an improvement of the efficiency by a reduction of the thermal expansion of the shaft, even without a specially designed housing, in that the changing of the running gaps which occur is accomplished in simple and effective manner by a reduction of the thermal expansion of the shaft throughout the operating range of the compressor machine.

Specifically, the invention proposes that means are provided for reducing the thermal expansion of the shaft in the housing in its longitudinal direction. These means thus have the effect, over the entire operating or temperature range of the flow machine, that running gaps increase or change only slightly or in the best case not at all, even at relatively high speeds or loads of the shaft.

In a first specific embodiment of the means for reducing the thermal expansion of the shaft in its longitudinal direction, it is proposed that the means comprise first means for cooling a motor or generator arranged in the housing and connected to the shaft, wherein the first means improve a heat flow from the shaft to the surroundings. Such first means accomplish an improved heat transfer from the shaft in the direction of the motor or generator to the surroundings, which limits the heating and thus the expansion of the shaft.

In a specific modification of the mentioned proposal, it is provided that the first means comprise a device for cooling a stator. The stator is usually situated in the area of the housing of the compressor machine and may comprise for example a cooling body, for the configuration with the first means according to the invention, which is arranged in operative connection with the surroundings, in order to make possible an improved heat flux or heat flow to the surroundings thanks to an air cooling.

In an alternative or different configuration of the first means, it may be provided that the first means comprise a structurizing of magnetic elements fastened to the shaft and/or surfaces of a stator interacting with the magnetic elements in order to improve the heat transfer from the magnetic elements to the stator. In other words, this means that the structurizing(s) bring about an improved heat flux across the air gap between the magnetic elements and the surfaces of the stator. Such a structurizing may be formed by way of example, and not exclusively, as a micro or macro-structurizing, the precise configuration of the structures being dependent on the Reynolds and the Taylor number.

In an alternative configuration it may also be provided that the means for reducing the thermal expansion of the shaft in its housing in the longitudinal direction comprise second means for at least indirect cooling of the shaft by means of air or gas.

Specifically, it may be provided that the second means involve a supplying of gas to the shaft that has been compressed from the region of at least one compressor or driving stage. Thus, a portion of the gas flowing across the impeller wheel of the compressor or driving stage is used to supply this to the shaft in order to cool it at its circumference and thereby lessen the thermal expansion.

Alternatively, it may be provided that the gas or the air escaping from leakage gaps in the area of the aerodynamic or aerostatic bearings is used to supply it to the shaft in order to cool it. However, it may also be provided that leakage air or leakage gas accruing in other regions of the compressor machine is used and conveyed to the housing or for the cooling of the shaft.

Alternatively or once again in addition it may be provided that the second means are designed to supply the compressed gas and/or the leakage air and/or the leakage gas to structural parts which can be heated at least indirectly by the shaft. Thus, this measure likewise enables an improved heat flow from the heated shaft across the structural parts arranged in operative connection with the shaft, especially to the surroundings.

BRIEF DESCRIPTION OF THE DRAWINGS

Further benefits, features and details of the invention will emerge from the following description of preferred exemplary embodiments as well as with the aid of the drawing.

This shows.

The same elements or elements with the same function are given the same reference numbers in the figures.

DETAILED DESCRIPTION

Figure 1:
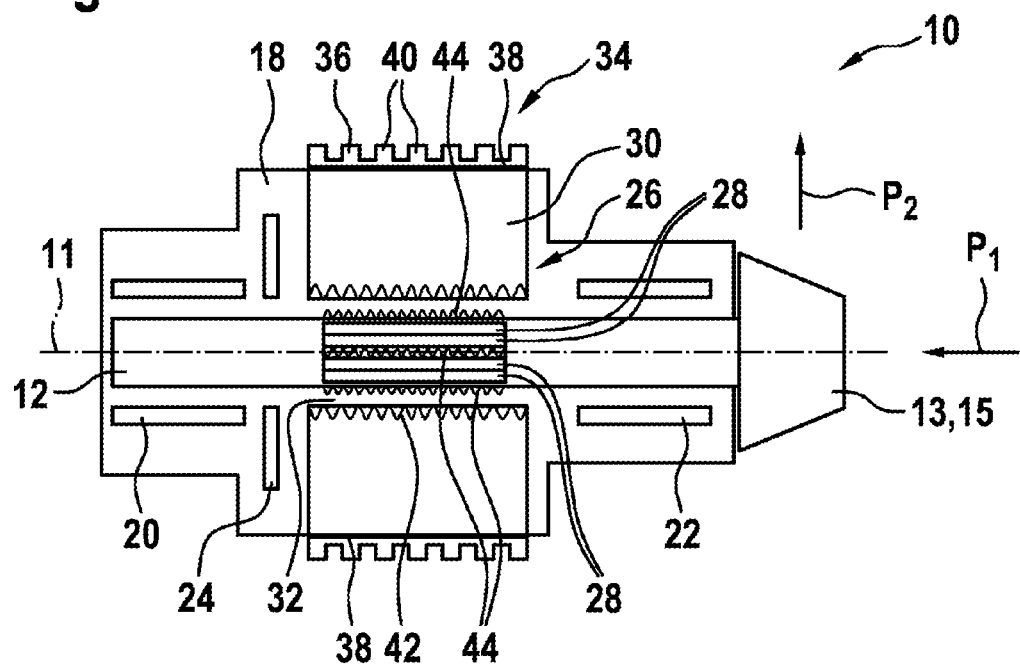
FIG. 1, a schematic representation of a compressor machine with an improved heat flow in the region of the stator or the rotor of the compressor machine, and FIG. 2, a likewise heavily simplified representation of a compressor machine in which leakage gas or leakage air is used to improve the cooling of the shaft or for heat dissipation.

FIG. 1 shows a first compressor machine 10 heavily simplified. The compressor machine 10 serves for the compressing of a gas and for this purpose it comprises a shaft 12 mounted so as to be rotatable about a longitudinal axis 11, being connected in rotationally fixed manner at one end to a compressor stage 15 comprising an impeller wheel 13. The compressor stage 15 or the impeller wheel 13 is designed as a flow means, in order to increase the pressure of the gas supplied around the impeller wheel 13 or sucked in from the impeller wheel 13 from a first pressure p1 to a second pressure p2 which is larger than the first pressure p1. The compressor machine 10 or the compressor unit furthermore comprises a housing 18, only a portion of which is shown, in which the shaft 12 is arranged for at least a portion. The housing 18 furthermore serves for the mounting of two radial bearings 20, 22 and one thrust bearing 24, the bearings being designed as aerodynamic or aerostatic bearings, i.e., they work by using gas or air as a lubricating medium between the shaft 12 and the respective bearing.

The shaft 12 is driven by means of an electric motor 26, comprising for example a plurality of magnetic elements 28 fastened to the circumference of the shaft 12 and interacting with a stator 30 situated in the region of the housing 18. Furthermore, between the magnetic elements 28 and the stator 30 there is formed a relatively small air gap 32 as an air gap 32 radially encircling the longitudinal axis 11.

During its operation, the shaft 12 becomes heated, as do the structural parts arranged in operative connection with the shaft 12 and the housing 18. For example, when the shaft 12 turns at a speed of more than 100 000 revolutions per minute, frictional heat arises in the area of the radial bearings 20, 22, resulting in a heating of the shaft 12. A transfer of heat also occurs from the impeller wheel 13 or the compressor stage 15 to the shaft 12, since heat arises upon compression of the gas in the compressor stage 15. The heating of the shaft 12 results in a thermal expansion of the shaft 12 in the direction of the longitudinal axis 11 of the shaft 12. This changes the running gaps between the shaft 12 and the structural parts surrounding the shaft 12 or the impeller wheel 13, resulting in impaired efficiency of the compressor machine 10.

In order to reduce this effect, the compressor machine 10 comprises first means 34, which serve for making possible an improved dissipation of heat from the shaft 12 to the surroundings. The first means 34 comprise an (annular) cooling element 36 arranged in operative connection with the stator 30. For this purpose, the cooling element 36 is connected for example via a thermally conductive glue 38 to the outer circumference of the stator 30 and it is designed to radiate the thermal energy introduced into the stator 30 from this to the surroundings. For example, the cooling body 36 may be designed as a structural part separate from the housing 18 or as a structural part integrated in the housing 18 and it likewise comprises cooling fins 40, merely as an example, for enlarging the radiating surface to the surroundings.

Furthermore, the first means 34 comprise structurizings 42, 44 situated both in the region of the magnetic elements 28 or the shaft 12 and also in the region of the stator 30, especially for increasing the surface of the stator 30 and the magnetic elements 28 in the region of the running gap 32. The structurizings 42, 44 may be formed as micro or macro-structurizings, for example by a laser structurizing, or a chemical etching process or the like. In particular, the structurizings 42, 44 serve on the one hand for an improved heat radiation from the shaft 12 and on the other hand for an improved heat absorption by the stator 30. In other words, this means that the structurizings 42, 44 bring about an improved heat flux or a reduced resistance to heat transfer between the magnetic elements 28 and thus the shaft 12 and the stator 30.

Figure 2:
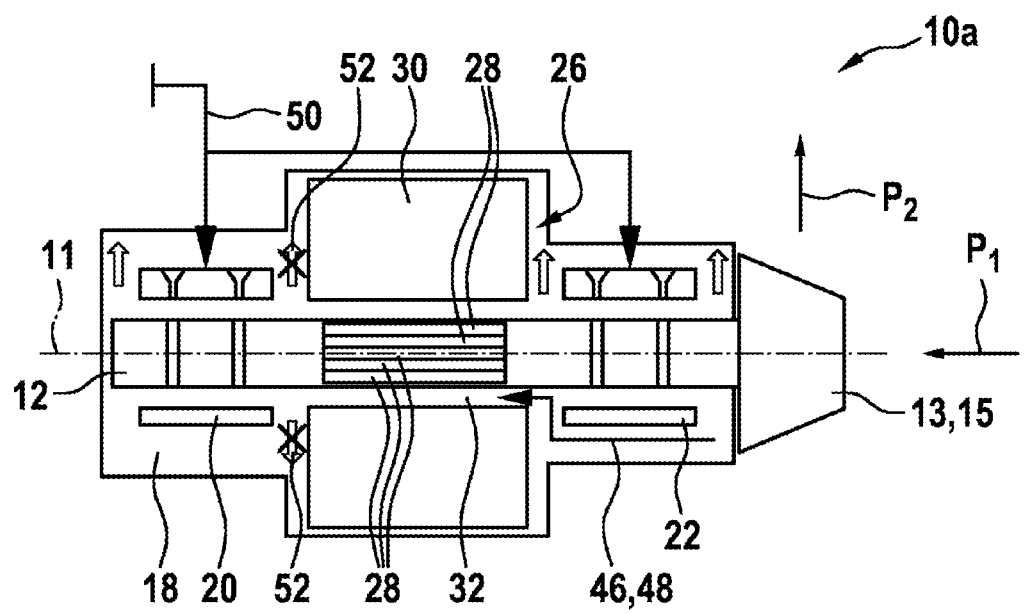

The compressor machine 10a shown in FIG. 2 differs from the compressor machine 10 of FIG. 1 in that second means 46 are provided, which bring about an active cooling of the shaft 12 or its structural parts arranged in operative connection with the shaft 12. Thus, for example, it is provided that compressed air or compressed gas in the region of the impeller wheel 13 is conveyed along a flow path 48 into the interior of the housing 18, especially into the region of the running gap 32 between the magnetic elements 28 or the shaft 12 and the stator 30. Although not shown more closely, it is of particular advantage for the compressor machine 10a to have in addition the first means 34 explained in connection with the compressor machine 10 to improve the heat dissipation from the shaft 12 to the surroundings. Thus, an active cooling of the shaft 12 is made possible by the supply of gas or air from the region of the impeller wheel 13 along the flow path 48.

Furthermore, additionally or alternatively, leakage air or leakage gas can be conveyed along the flow path 48 into the housing 18 for the cooling of the shaft 12 from regions of the compressor machine 10a other than the impeller wheel 13.

Moreover, it can be seen with the help of the representation in FIG. 2 that the radial bearings 20, 22 are supplied with the gas or air serving for the operation of the aerodynamic or aerostatic bearings by means of a feed line 50. It may also be provided to use at least a portion of the leakage air escaping from the region of the radial bearings 20, 22 likewise for the cooling of the shaft 12. This is indicated by the crossed-out arrow 52, which is meant to show that the leakage air escaping from the one radial bearing 20 is not given off to the surroundings, but instead for example taken to the air gap 32 between the magnetic elements 28 or the shaft 12 and the stator 30.

The compressor machine 10, 10a described thus far can be changed or modified in many ways without departing from the notion of the invention. Thus, for example, it is conceivable to use bearing devices which combine the functionality of a radial bearing and a thrust bearing in a single bearing device. Moreover, it is conceivable, especially in the compressor machine 10a, to detect for example the rotary speed or other operating parameters of the compressor machine 10a and supply this to a control unit. This control unit then regulates, for example, the supply of leakage air or air from the impeller wheel 13 and serving for the cooling of the shaft 12.

The invention claimed is:

1. A compressor machine (10; 10a) having a shaft (12) which is arranged in a housing (18) so as to be able to rotate about a longitudinal axis (11), wherein the shaft is mounted in at least two radial bearings (20, 22) and one thrust bearing (24), wherein the radial bearings (20, 22) and/or the thrust bearing (24) are an aerodynamic or aerostatic bearing, and wherein the shaft (12) is connected at least indirectly to a compressor stage (15) or a driving stage comprising an impeller wheel (13), further comprising reduction means (34, 46) for reducing the thermal expansion of the shaft (12) in the housing (18) in a direction of the longitudinal axis (11), further comprising magnetic elements (28) fastened to the shaft (12) and a stator (30) interacting with the magnetic elements (28), wherein the reduction means (34, 46) include first means (34) for heat flow from the shaft (12) to surroundings, and wherein the first means (34) comprise a structurizing (42) of a surface of the stator (30) facing the magnetic elements (28) such that heat transfers from the magnetic elements (28) and the stator (30).

2. The compressor machine according to claim 1, characterized in that the first means (34) further comprise a device (36) for cooling the stator (30).

3. The compressor machine according to claim 1, characterized in that the first means (34) further comprise a structurizing (44) of the magnetic elements (28) fastened to the shaft (12) such that the heat transfers from the magnetic elements (28) to the stator (30).

4. The compressor machine according to claim 1, characterized in that the reduction means comprise second means (46) for at least indirect cooling of the shaft (12) by means of gas.

5. The compressor machine according to claim 4, characterized in that the second means (46) involve a supplying of gas to the shaft that has been compressed from the region of the at least one compressor stage (15) or driving stage.

6. The compressor machine according to claim 5, characterized in that the second means (46) are additionally configured to supply the compressed gas and/or the leakage air and/or the leakage gas to structural parts which can be heated at least indirectly by the shaft (12).

7. The compressor machine according to claim 4, characterized in that the second means (46) involve a supplying of leakage air accruing in the region of the radial bearings (20, 22) and/or the thrust bearing (24), to the shaft (12) or into the region of an air gap (32) between the shaft (12) and the stator (30).

8. The compressor machine according to claim 4, characterized in that the second means (46) involve a supplying of gas or air accruing in the region of the compressor machine (10; 10a) radially outside the radial bearings (20, 22) and/or outside the thrust bearing (24), to the shaft (12) or into the region of an air gap (32) between the shaft (12) and the stator (30).

9. The compressor machine according to claim 1, characterized in that the compressor machine (10; 10a) is a compressor unit for gas.

10. The compressor machine according to claim 1, characterized in that the reduction means comprise second means (46) for at least indirect cooling of the shaft (12) by means of air.

11. A compressor machine (10; 10a) having a shaft (12) which is arranged in a housing (18) so as to be able to rotate about a longitudinal axis (11), wherein the shaft is mounted in at least two radial bearings (20, 22) and one thrust bearing (24), wherein the radial bearings (20, 22) and/or the thrust bearing (24) are an aerodynamic or aerostatic bearing, and wherein the shaft (12) is connected at least indirectly to a compressor stage (15) or a driving stage comprising an impeller wheel (13), further comprising reduction means (34, 46) for reducing the thermal expansion of the shaft (12) in the housing (18) in a direction of the longitudinal axis (11), wherein the reduction means include first means (34) for cooling a motor (26) or generator arranged in the housing (18) and connected to the shaft (12) such that heat flows from the shaft (12) to surroundings, wherein the reduction means comprise second means (46) for at least indirect cooling of the shaft (12) by means of gas, wherein the second means (46) involve a supplying of gas to the shaft that has been compressed from the region of the at least one compressor stage (15) or driving stage, and wherein the second means (46) involve a supplying of gas or air accruing in the region of the compressor machine (10; 10a) radially outside the radial bearings (20, 22) and/or outside the thrust bearing (24), to the shaft (12) or into the region of an air gap (32) between the shaft (12) and a stator (30), further comprising magnetic elements (28) fastened to the shaft (12) and the stator (30) interacting with the magnetic elements (28), wherein the first means (34) comprise a structurizing (42) of a surface of the stator (30) facing the magnetic elements (28) such that heat transfers from the magnetic elements (28) and the stator (30).

12. The compressor machine according to claim 11, characterized in that the first means (34) comprise a device (36) for cooling the stator (30).

13. The compressor machine according to claim 11, characterized in that the first means (34) comprise a structurizing (42, 44) surfaces of the magnetic elements (28) fastened to the shaft (12) and/or surfaces of the stator (30) interacting with the magnetic elements (28) such that heat transfers from the magnetic elements (28) to the stator (30).

14. The compressor machine according to claim 13, characterized in that the second means (46) involve a supplying of leakage air accruing in the region of the radial bearings (20, 22) and/or the thrust bearing (24), to the shaft (12) or into the region of the air gap (32) between the shaft (12) and the stator (30).

15. The compressor machine according to claim 14, characterized in that the second means (46) is additionally configured to supply the compressed gas and/or the leakage air and/or the leakage gas to structural parts which can be heated at least indirectly by the shaft (12).

16. The compressor machine according to claim 11, characterized in that the compressor machine (10; 10a) is a compressor unit for gas.

17. The compressor machine according to claim 11, characterized in that the reduction means comprise second means (46) for at least indirect cooling of the shaft (12) by means of air.

* * * * *